United States Patent [19]

King

[11] Patent Number: 5,121,280

[45] Date of Patent: Jun. 9, 1992

[54] ZONE SERVO SECTOR FORMAT ALIGNMENT SCHEME FOR SERVO AND SPINDLE MOTOR CONTROL

[75] Inventor: Francis K. King, San Jose, Calif.

[73] Assignee: Syquest Technology, Fremont, Calif.

[21] Appl. No.: 686,245

[22] Filed: Apr. 16, 1991

Related U.S. Application Data

[63] Continuation of Ser. No. 383,758, Jul. 19, 1989, abandoned.

[51] Int. Cl.$^5$ ............................................... G11B 5/82
[52] U.S. Cl. .................... 360/135; 360/73.03; 360/48
[58] Field of Search ............... 360/135, 73.03, 51, 360/48

[56] References Cited

U.S. PATENT DOCUMENTS

| 4,016,603 | 4/1977 | Ottesen | 360/72.2 |
| 4,486,870 | 12/1984 | Pettigrew | 369/32 |
| 4,714,967 | 12/1987 | Bizjak | 360/49 |
| 4,918,677 | 4/1990 | Ashinuma et al. | 360/51 |

*Primary Examiner*—Aristotelis Psitos
*Assistant Examiner*—David L. Robertson
*Attorney, Agent, or Firm*—Fliesler, Dubb, Meyer & Lovejoy

[57] ABSTRACT

A zone servo sector format alignment scheme 41 for a disc 22 of a disc drive 20 includes the disc 22 having an outer zone 42, a middle zone 44 and an inner zone 46, each zone having a plurality of tracks 48, 50, 52. The sectors, 54, 56, 58 of each zone 42, 44, 46 includes a plurality of sectors such as sector 60 which define a servo field 62 and a data field 64. The number of sectors 56 in each of tracks 50 of the middle zone 46 is less than the number of sectors 54 on each track 48 of the outer zone 42. The number of sectors 58 on each track 52 of the inner zone 46 is less than the number of sectors 56 on each tracks 50 of the middle zone 46. Further, by maintaining the same recording frequency of the servo fields 62 across all the zones 42, 44, 46, the placing of the sectors 56, 58 in the middle and inner zones 44, 46 can be adjusted in order to provide for alignment indicia 66 which include aligned sectors across all the zones. Such alignment indicia 66 are positioned about the disc 22 and facilitate the operation of the servo control circuit 36 for facilitating head seeking.

16 Claims, 3 Drawing Sheets

ZONE SERVO SECTOR FORMAT ALIGNMENT SCHEME FOR SERVO AND SPINDLE MOTOR CONTROL

This application is a continuation of Ser. No. 07/383,758, filed Jul. 19, 1989, now abandoned.

FIELD OF THE INVENTION

The present invention relates to a zone recording format for media used in disc drives.

BACKGROUND ART

Presently, discs for use in disc drives are formatted to contained servo information and data in a variety of ways. One of the most common formats used with drives with multiple discs is that of a dedicated servo surface. In such an arrangement, one of the surfaces of one disc is dedicated for containing a high frequency of servo information, which information allows the read/write registration head to be maintained continuously on a track (track registration) and also which is used for seeking new track locations.

Another format which is often used is that of a single or a multiple servo sector design whereby servo information is associated with a block of data. In a single servo sector format, each track or cylinder of the disc has a single field which serves as a servo field and one or more fields which serve as data fields. In formats having multiple servo sectors, there are a multiplicity of servo fields which are spaced about the disc, each associated with one or more data fields. The servo fields on all of the tracks are radially aligned as are the data fields. Such alignments of the servo fields is highly advantageous in order to simplify head centering or registration and seek functions.

A disadvantage of such an arrangement is that there is inefficient use of space for storing data. Generally, the same amount of data is stored on the inner as well as the outer track. Thus, the density of the transitions on the outer track is much less than the density of the transitions on the inner track, resulting in an inefficient use of the storage capacity of the disc on the outer tracks.

Quite recently, a zone recording format has been employed in practice which clusters the tracks or cylinders into two or more concentric zones such as an outer zone, one or more middle zones and an inner zone. Each of these zones is packed with a number of sectors containing data, which sectors are equally spaced around the track. Generally, the tracks in the outer zone would have the highest number of equally spaced sectors. The middle zones would have the next highest number of equally spaced sectors. The inner zone would have the lowest number of equally spaced sectors. Such an arrangement, as can be appreciated, is highly advantageous as each of the tracks from the outer most track to the inner most track can be packed with the optimal number of transitions per inch, greatly increasing the storage capacity of the disc media of the disc drive.

Such an arrangement, however has a disadvantage in that only the starting point of each of the first sector of each track can be aligned across different zones. Such an arrangement is thus highly disadvantageous in obtaining servo information along the entire track in order to assist in the head seeking operation which involves crossing zones. Only one reference per revolution is available for servo synchronization.

SUMMARY OF THE INVENTION

The present invention incorporates the advantages of a zone recording scheme, while overcoming the present disadvantageous of such a scheme.

As an object of the present invention, a multiplicity of radial alignment indicia are defined at spaced locations about the disc by radially aligned sectors which have servo fields and data fields across zones. Such alignment is accomplished by allowing the sectors in the outer zone to be equally spaced about the disc and then by adjusting the spacing of the sectors in the middle and inner zones so that they are not equally spaced. Accordingly, selected of the sectors of the middle and inner zones are radially aligned with selected sectors of the outer zone to form a plurality of radially alignment indicia. One of which alignment indicia is the radial index indicia.

Another object of the present invention is to maintain the number of bits per sector constant throughout the zones.

Yet a further object of the present invention is to maintain the recording frequency for a servo field portion of each sector at the same frequency while decreasing the recording frequency for the data field of each sector across the zones. Thus the recording frequency of the data field of the sectors in the outer zone are greater than the recording frequency of the data fields of the sectors in the middle zone which are, in turn, greater than the recording frequency of the data fields of the sectors in the inner zone.

Yet another object of the present invention is to provide for unequal sector spacing in the middle zones and the inner zone by creating a recording gap between the last sector on each track and the index indicia, with the recording gaps being larger for the inner track in comparison to the middle tracks.

A zone servo sector format alignment scheme for rotating memory media of a disc drive comprises an outer recording zone defined on the media containing a preselected number of outer data tracks and an inner recording zone defined on the media containing a preselected number of inner data tracks. Each of said outer data tracks has a preselected number of outer sectors which contain servo information and data. Each of said inner tracks has a preselected number of inner sectors which contain servo information and data. The number of outer sectors for each track is not equal to the number of inner sectors for each track. Further selected of the outer sectors are radially aligned with selected inner sectors to define a plurality of radial alignment indicia.

In another aspect of the invention, each of the outer sectors has an outer servo field and an outer data field and each of the inner sectors has an inner servo field and an inner data field. The servo information on the inner servo field is recorded at the same frequency as the servo information on the outer servo field while the data on the inner data field is recorded at a lower frequency than the data on the outer data field.

In yet another aspect of the invention, the outer sectors are equally spaced along each outer track and the inner sectors are unequally spaced along each inner track.

In still another aspect of the invention, the alignment indicia are defined by the beginning of the selected inner servo fields and the beginning of the selected outer servo fields.

In a further aspect of the invention wherein one of the radial alignment indicia is defined as an index indicia, there is a first recording gap, which is smaller than an inner sector, defined between the last inner sector on each inner track and the index indicia.

In still other aspects of the invention, one or more middle recording zones can be disposed between the outer and inner zones while maintaining alignment between selected sectors of the outer, middle and inner zones so as to define a plurality of alignment indicia about the disc.

Further, the assignee of the present applicant has developed new classes of disc drives whereby the discs are either magnetically coupled or physically connected to the spindle motor (see U.S. patent application No. 270,948, filed Nov. 14, 1988 and U.S. patent application No. 270,005, filed Nov. 14, 1988). In the case of the magnetically coupled but not physically connected configuration, there is open spacing between the spindle motor and disc hub. In such magnetically coupled arrangements, as there is not a direct relationship between the spindle motor and the disc, there being some springiness between the disc and the spindle motor, it is important to understand that the feedback directly from the spindle motor is not generally enough to insure disc rotational stability. The usual single servo and single index feedback from the disc media is also not sufficient to provide the stability control due to potential inter-revolution irregularities. Accordingly, multiple feedbacks per revolution are necessary. Thus, the present invention provides for multiple synchronization feedbacks across the zones of a disc embedded with a zone recording scheme.

DETAILED DESCRIPTION OF THE PREFERRED EMBODIMENT

Figure 1:
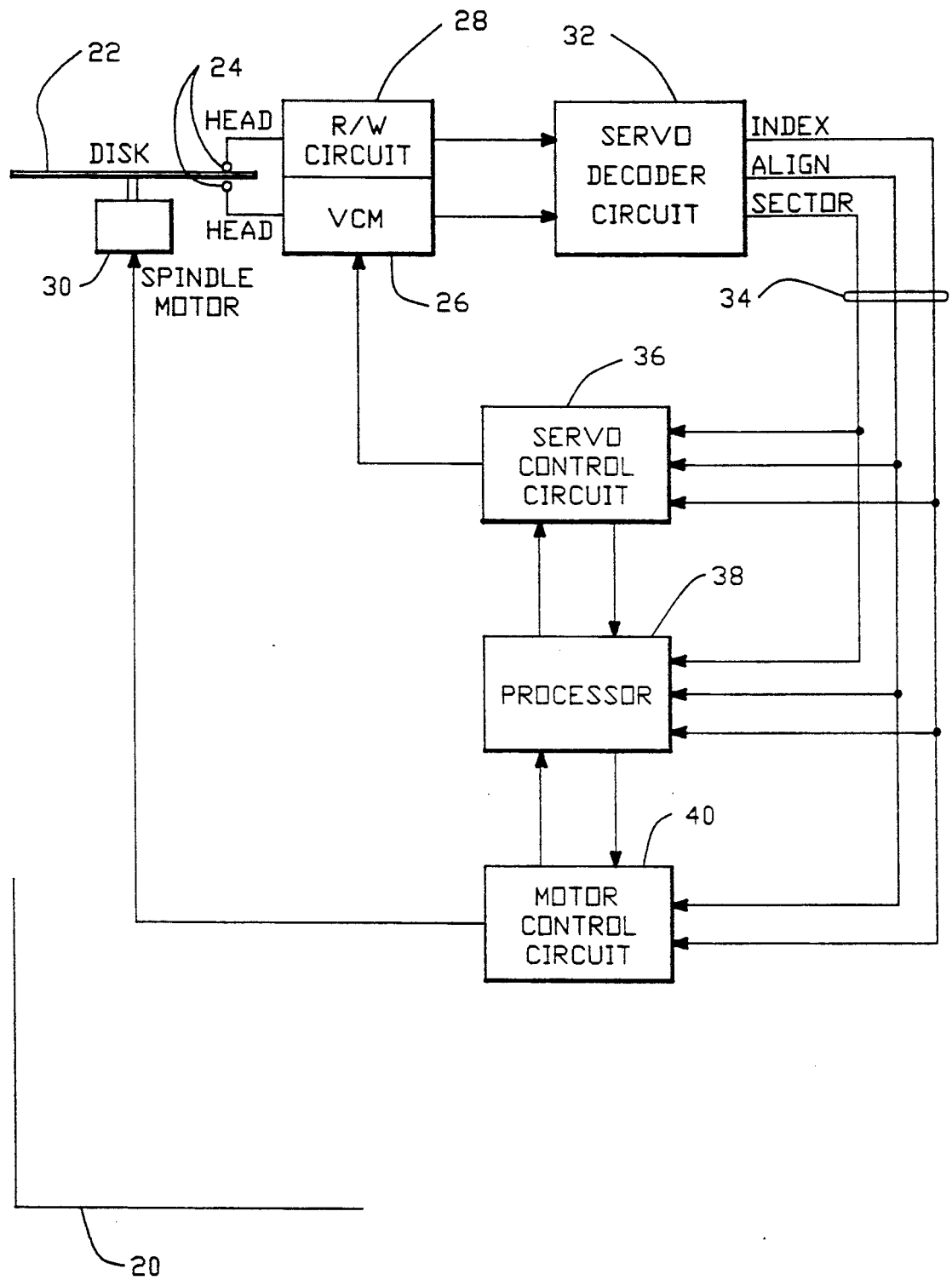
FIG. 1 depicts a block diagram of servo motor and spindle motor control circuits for a disc drive using the present invention.

With respect to FIG. 1, a disc drive 20, which either permanently or removably receives a disc 22, is depicted. The disc drive 20 includes heads 24 which are mounted to an actuator such as voice coil motor (VCM) 26 and associated with read/write circuit 28 for reading and/or writing information at a desired location, as accessed by the movement of the heads 24 by the voice coil motor 26. The disc is provided in rotation by the spindle motor 30. Servo information recorded on the disc is provided through the read/write circuit 28 to servo decoder circuit 32. The output of which servo decoder circuit 32 is provided over lines 34 to the servo control circuit 36, for the voice coil motor 26. Further, the output from the servo decoder circuit is provided to the motor control circuit 40 for the spindle motor 30 and the microprocessor 38 in order to control the control circuits 36, 40. Thus, the information on the servo sectors embedded on the disc, is read, interpreted and used by the servo control circuit 36 to accomplish the head centering or registration and seeking tasks in order to place the head on the desired track and to keep the head centered on the track. The servo information is further used to determine and look in the speed of the spindle motor in order to stabilize the speed of the disc. Further, details of the motor control circuit can be acquired from U.S. patent application filed herewith entitled "Spindle Motor Control Circuit" with the inventor being Alan G. Grace and the assignee being Syquest Technology.

Figure 2:
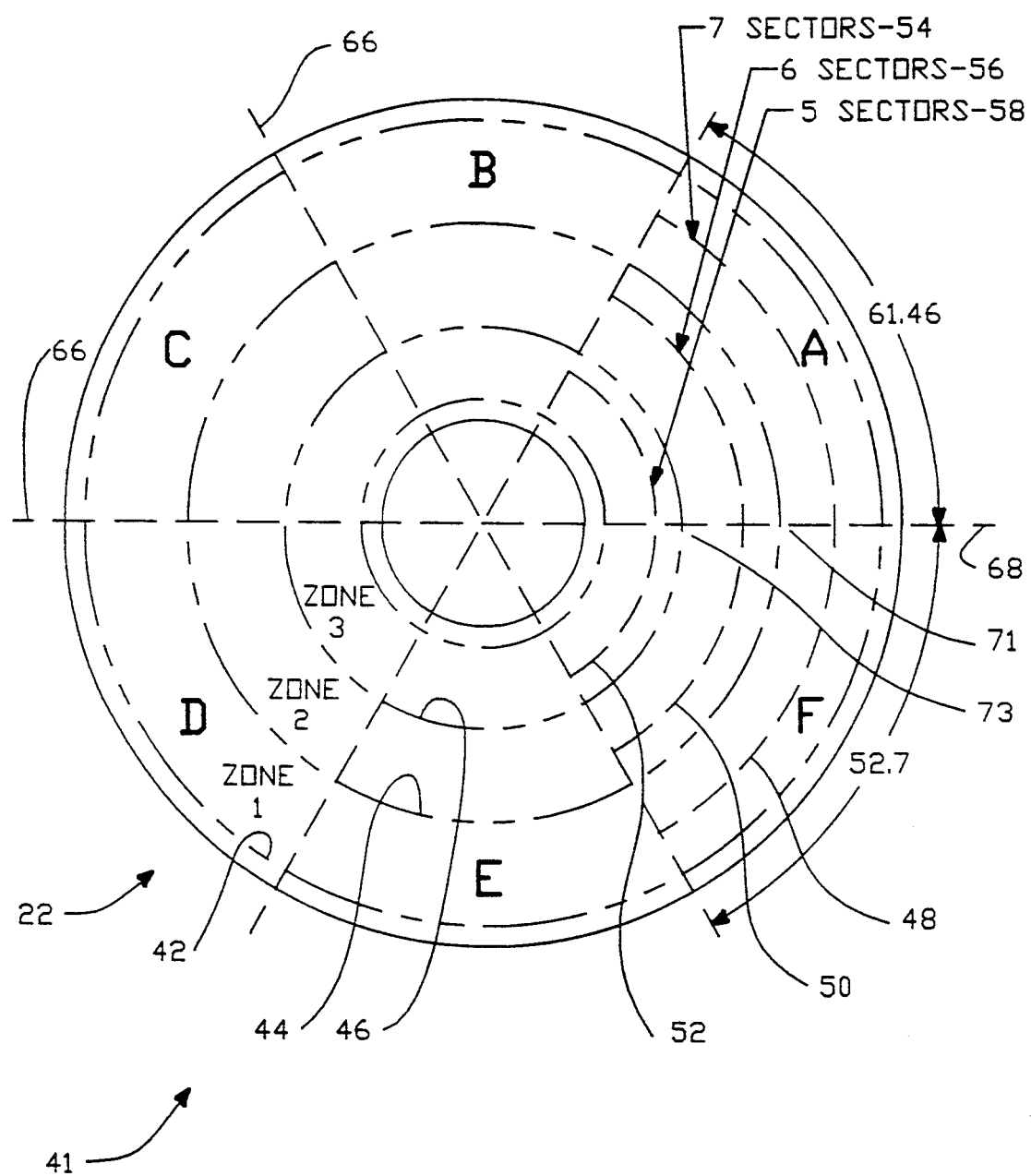
FIG. 2 depicts a disc formatted in accordance with the present invention.

In accordance with the invention, the disc 22 is divided into a plurality of concentric zones such as outer zone 42, middle zone 44 and inner zone 46 (FIG. 2). It is to be understood that in alternative embodiments, the middle zone 44 can be replaced by a plurality of middle zones. Each of these zones include a plurality of tracks or cylinders such as outer track 48, middle track 50 and inner track 52. On each of these tracks are defined a plurality of sectors such as outer sectors 54, middle sectors 56 and inner sectors 58.

Figure 3:
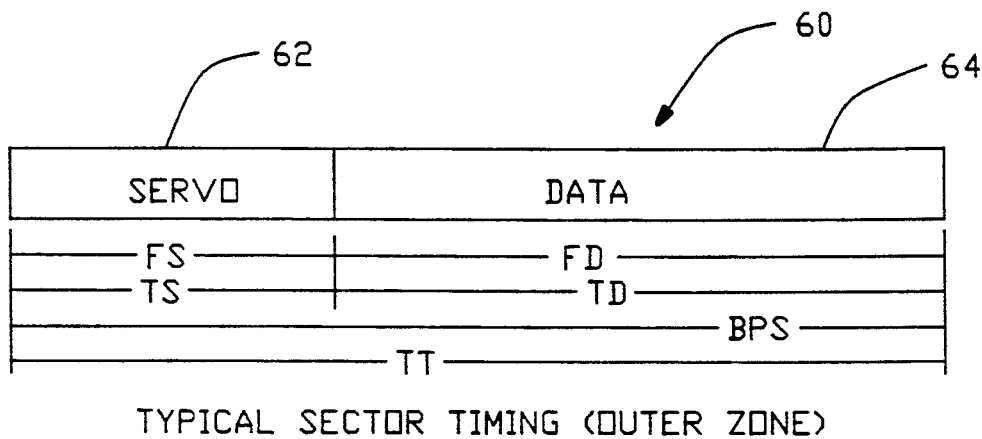
FIG. 3 depicts a typical sector which can be formatted on an outer track of an outer zone.

FIG. 3 depicts a typical sector format 60 which is embedded in the outer track 48. This sector format includes a servo field 62 and a data field 64. A breakdown of the format of the servo field is shown in Table 1.

Table 1 Servo Data Format

[Sync][ID][alignbit][indexbit][tracknumber][Servo burst]

For any given disc rotational speed, the length of the sector is designated in terms of time and denoted by the letters TT for "Total Time". The length of the servo field is denoted by the letters TS, for "Time Servo" and that of the data field by letters TD, for "Time Data". With respect to the outer sectors 54, as can be seen FIG. 2, these are evenly spaced about the outer tracks 48 of the outer zone 42.

In order to provide for alignment indicia, such as the six alignment indicia designated by the numbers 66 in FIG. 2, selected of the middle sectors 56 and inner sectors 58 must be aligned with selected of the outer sectors 54. This is accomplished by adjusting the spacing of the sectors in the middle zones 44 and inner zone 46.

In a preferred embodiment, the number of sectors in the outer zone is 41 sectors per tack, with the middle zone having 35 sectors per track and the inner zone having 29 sectors per track. Where such sectors in each zone equally spaced, along the various tracks, these sectors included in the tracks of each zone could be aligned, however, there could be no radially alignment across the zones.

In a preferred embodiment, with the disc rotates at a speed of 3500 rpm, there is a corresponding period of rotation of 17,142.8 microseconds. That being the case, outer, middle, and inner sectors, if equally spaced along tracks in the respective zones, would have sector intervals of 418.12, 489.80 and 591.13 microseconds respectively for each sector. This would correspond to the total time, TT, designation in FIG. 2. However as indicated above, such a configuration would not allow for the defining of a plurality of radial alignment indicia across the zones.

Accordingly, while the spacing of the sectors in the outer zone 42 is maintained equally about the tracks in the outer zone, the spacing of the sectors in the middle and inner zone are adjusted in order to define the alignment indicia 66. Such adjustment requires that the sector timing for the middle zone be altered to be 487.80 microseconds while the sector timing for the inner zone is altered to be 585.36 microseconds.

Table 2 represents the beginning sector times for each sector in the outer, middle and inner zones. The alignment indicia 66 in this preferred embodiment includes a total of six alignment indicia including the beginning alignment indicia which is identified as the index 68. Between these alignment indicia 66 are defined six sections designated by the letters A, B, C, D, E, and F. The starting times for each of the sectors in each of these sections A, B, C, D, and F are identified in the Table 2. Taking for example section A, it can be seen that there are seven sector starting times in the outer zone, six sector starting times in the middle zone and five starting times in the inner zone, representing respectfully, seven, six and five sectors on each track for the zones in this section A. The same is true as far as the number of sectors in sections B through E. In section F, as indicated by the Table 2, there are only six sectors of length 418.12 microseconds in the tracks of the outer zone, five sectors for the tracks in the middle zone, the five sectors being of length 487.8 microseconds for the middle tracks, and four sectors of length 585.36 microseconds for the inner track.

A close examination of Table 2 reveals that there is a gap 71 of 69.69 microseconds in the middle zone on each track between the end of the last full sector and the beginning of the first sector as defined at the start of the index 68. This last sector has a length of 487.80 microseconds and ends 17,073.17 microseconds from the beginning of the index indicia designated as either 0 microseconds or 17,142.86 microseconds. Similarly, there is a gap 73 of 167.26 microseconds between the last full sector on the tracks of the inner zone and the index which represents the difference between 16,975.60 microseconds and 17,142.86 microseconds. The asterisks in Table 2 denote the beginning times for the aligned sectors across the zones which define the alignment indicia 66. These beginning times represent the beginnings of the servo fields as the servo fields are placed first in the sector.

TABLE 2

| | Beginning Times for Sectors | | |
|---|---|---|---|
| | Zone 1 | Zone 2 | Zone 3 |
| | * 0.0 | * 0.0 | * 0.0 |
| | 418.12 | 487.80 | 585.36 |
| | 836.24 | 975.61 | 1170.73 |
| A | 1254.36 | 1463.41 | 1756.10 |
| | 1672.47 | 1951.22 | 2341.46 |
| | 2090.59 | 2439.02 | * 2926.83 |
| | 2508.71 | * 2926.83 | 3512.20 |
| | * 2926.83 | 3414.63 | 4097.56 |
| | 3344.95 | 3902.44 | 4682.93 |
| | 3763.07 | 4390.24 | 5268.29 |
| | 4181.18 | 4878.05 | * 5853.66 |
| B | 4599.30 | 5365.85 | 6439.02 |
| | 5017.42 | * 5853.66 | 7024.39 |
| | 5435.54 | 6341.46 | 7609.76 |
| | * 5853.66 | 6829.27 | 8195.12 |
| | 6271.78 | 7317.07 | * 8780.49 |
| | 6689.90 | 7804.88 | 9365.85 |
| C | 7108.01 | 8292.68 | 9951.22 |
| | 7526.13 | * 8780.49 | 10536.59 |
| | 7944.25 | 9268.29 | 11121.95 |
| | 8362.37 | 9756.10 | * 11707.32 |
| | * 8780.49 | 10243.90 | 12292.68 |
| | 9198.61 | 10731.71 | 12878.05 |
| | 9616.72 | 11219.51 | 13463.41 |

TABLE 2-continued

| | Beginning Times for Sectors | | |
|---|---|---|---|
| | Zone 1 | Zone 2 | Zone 3 |
| | 10034.84 | * 11707.32 | 14048.78 |
| D | 10452.96 | 12195.12 | * 14634.15 |
| | 10871.08 | 12682.93 | 15219.51 |
| | 11289.20 | 13170.73 | 15804.88 |
| | * 11707.32 | 13658.54 | 16390.24 |
| | 12125.44 | 14146.34 | 16975.60 |
| | 12543.55 | * 14634.15 | 17142.86 |
| | 12961.67 | 15121.95 | |
| E | 13379.79 | 15609.76 | |
| | 13797.91 | 16097.56 | |
| | 14216.03 | 16585.37 | |
| | * 14634.15 | 17073.17 | |
| | 15052.26 | 17142.86 | |
| | 15470.38 | | |
| F | 15888.50 | | |
| | 16306.62 | | |
| | 16724.74 | | |
| | 17142.86 | | |

Figure 4:
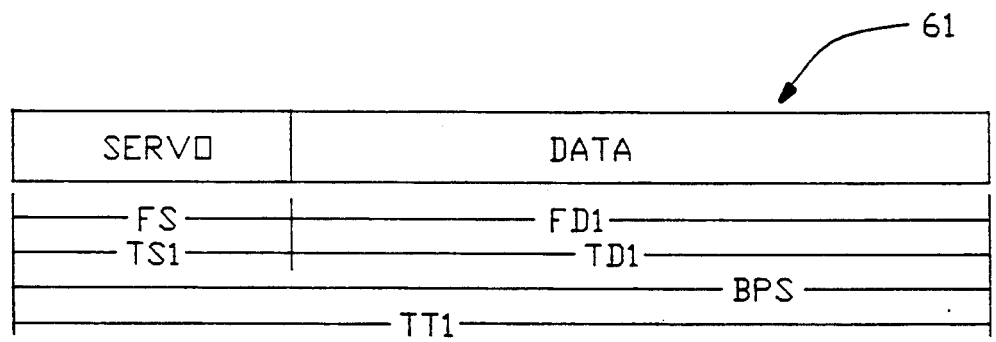
FIG. 4 depicts an adjusted sector which would be positioned on one of the tracks of the middle or inner zones.
Figure 5:
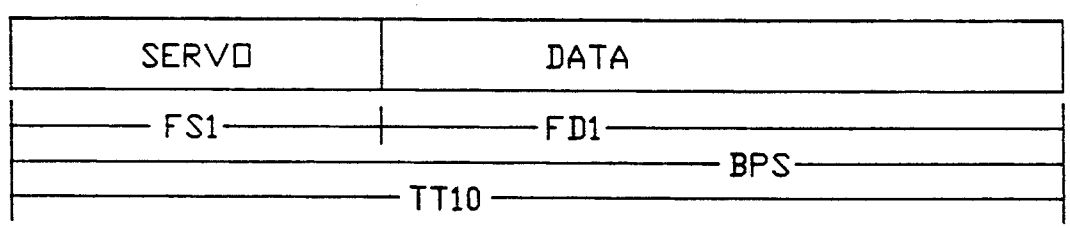
FIG. 5 depicts original sector formats for the middle and inner zones.

As is shown in FIG. 3, the total bits per sector, BPS for the sectors in the outer zone is indicated. With respect to the sectors in the middle and inner zones, the original sector formats are shown in FIG. 5 and adjusted sector formats are shown in FIG. 4 and include the same number of bits per sector, BPS as found in the typical sectors in the outer zone. Per the adjustment of the invention (FIGS. 3, 4) the recording frequency across the zones for the servo field (FS) is held constant and in a preferred embodiment is 12 MHz. Thus, TSI (servo time period in a middle or inner zone) is less that TS (servo time period in an outer zone). In a preferred embodiment, the data in the data fields in the outer field is recorded at a recording frequency (FD) of 12 MHz while the data in the data fields of the middle and inner sectors are recorded at recording frequencies (FD1) of 10 MHz and 7.5 MHz, respectively. Thus, TD (data time period in the outer zone) is less than TD1 (data time period in the middle or inner zones).

The adjusted TT1 is less than TT1O. This scheme allows room for sector timing period adjustment in the middle and inner zones.

By keeping the recording frequency constant for all of the servo fields, the servo fields in the middle and inner zones take less space than a typical servo field of the outer zone which is recorded at the same frequency as the data field of the outer zone and allows for the creation of the resultant alignment indicia indicated above.

Industrial Applicability

The operation of the present invention is such that servo data at least along the alignment indicia can be conveniently used for providing synchronization across the zones in order to control the head seek and registration operation. Such an arrangement is extremely advantageous in a situation where there is not a direct link between the spindle motor and the disc. Such a situation arises with the assignee's most current design whereby magnetic coupling is utilized to couple the disc to the spindle motor. Such an arrangement is also highly advantageous with the use of zoned recording on discs which allows data to be optimally recorded on the disc in the various zones, even though the number of sectors on each track in each of the zones is different, in order to accomplish optimal data densities. The invention allows for the definition of the alignment indicia by keeping the recording frequency of the servo field constant across all zones and by adjusting the position of the sectors in the middle and inner zones in order to create the proper alignment.

Other aspects and objects of the invention can be obtained from a review of the appended claims and the figures.

It is to be understood that other embodiments of the present invention, which include by way of example only, sectors of different length and different numbers and locations of alignment indicia, can come within the spirit and scope of the invention as claimed.

What is claimed is:

1. A zone servo sector format alignment scheme for rotating memory media of a disc drive comprising:
    an outer recording zone defined on the media containing a preselected number of outer tracks;
    each of said outer tracks having a preset number of outer sectors;
    a set of preselected radial alignment indica spaced circumferentially about the media and aligned with selected of said outer sectors;
    an inner recording zone defined on the media containing a preselected number of inner tracks;
    each of said inner tracks having a preselected number of inner sectors;
    wherein one of the number of preselected inner sectors is aligned with each of the radial alignment indica;
    a middle recording zone located between said outer recording zone and said inner recording zone of said media;
    said middle recording zone containing a preselected number of data tracks;
    each of said middle data tracks define a preselected number of middle sectors;
    wherein the number of inner sectors is less than the number of middle sectors, and the number of middle sectors is less than the number of outer sectors; and
    wherein one of the number of preselected middle sectors is aligned with each of the radial alignment indicia.

2. The alignment scheme of claim 1 wherein:
    each of the time periods of the inner sectors has been adjusted so that each adjusted time period is less than the maximum possible time period for each of the inner sectors.

3. The alignment scheme of claim 1 wherein:
    the alignment indicia are colinear with the beginning of said selected inner sector and the beginning of said selected outer sector.

4. The alignment scheme of claim 1 wherein:
    one of said radial alignment indicia is defined as an index indicia; and
    wherein there is a first gap, which has a time period that is smaller than the time period for each inner sector, which first gap is located between a last inner sector on each inner track and the index indicia.

5. The alignment scheme of claim 1 wherein:
    each of the time periods of the middle sectors has been adjusted so that each adjusted time period is less than the maximum possible time period for each of the middle sectors.

6. The alignment scheme of claim 1 wherein:
    each of said outer sectors has an outer servo field and an outer data field;
    each of said inner sectors has an inner servo field and an inner data field;
    each of said middle sectors has a middle servo field and a middle data field;
    servo information on said outer, inner and middle servo fields is recorded at the same frequency; and
    data on said inner data field is recorded at a lower frequency than the data on said middle data field, and data on said middle data field is recorded at a lower frequency than the data on said outer data field.

7. The alignment scheme of claim 1 wherein:
    the alignment indicia are colinear with the beginning of said selected outer, inner and middle sectors.

8. The alignment scheme of claim 1 wherein:
    one of said radial alignment indicia is defined as an index indicia;
    there is a first gap which has a time period that is smaller than the time period for each middle sector, which first gap is located between a last middle sector of each middle track and the index indicia; and
    there is a second gap which has a time period that is smaller than the time period for each inner sector, which second gap is located between a last inner sector of each inner track and the index indicia.

9. A zone servo sector format alignment scheme for rotating memory media of a disk drive comprising:
    an outer recording zone defined on the media containing a preselected number of outer data tracks;
    each of said outer data tracks have a preselected number of outer sectors which contain a preselected number of outer information bits defining an outer servo field and an outer data field;
    a set of preselected radial adjustment indicia spaced circumferentially about the media and aligned with selected of said outer sectors;
    an inner recording zone defined on the media containing a preselected number of inner data tracks;
    each of said inner data tracks have a preselected number of inner sectors which contain a preselected number of inner information bits defining an inner servo field and an inner data field;
    wherein the number of outer information bits for each outer sector is equal to the number of inner information bits for each inner sector;
    wherein one of the number of preselected inner sectors is aligned with each of the radial alignment indicia;
    a middle recording zone located between said outer recording zone and said inner recording zone of said media;
    said middle recording zone containing a preselected number of middle data tracks;
    each of said middle data tracks define a preselected number of middle sectors which contain a middle servo field and a middle data field;
    wherein the number of inner sectors is less than the number of middle sectors, and the number of middle sectors is less than the number of outer sectors; and
    wherein one of the number of preselected middle sectors is aligned with each of the radial adjustment indicia.

10. The alignment scheme of claim 9 wherein:
    information on said outer servo field is recorded on the media at a frequency that is the same as the frequency of recordation of the information of said inner servo field; and the frequency of recordation of information on the outer data field is faster than the frequency of recordation of information on said inner data fields.

11. The alignment scheme of claim 9 wherein:

the alignment indicia are colinear with the beginning of said selected inner servo fields and the beginning of said selected outer servo fields.

12. The alignment scheme of claim 9 wherein:

one of said radial alignment indicia is defined as an index indicia; and there is a first gap which has a time period that is smaller than a time period for each inner sector, which first gap is located between a last inner sector on each inner track and the index indicia.

13. The alignment scheme of claim 9 wherein:

servo information on said inner servo field is recorded at the same frequency as the servo information on said outer servo field.

14. The alignment scheme of claim 9 wherein:

one of said radial alignment indicia is defined as an index indicia;

there is a first gap which has a time period that is smaller than a time period for each middle sector, which first gap is located between a last middle sector of each middle data track and the index indica; and there is a second gap, which has a time period that is smaller than a time period for each inner sector, which second gap is located between a last inner sector of each inner track and the index indicia.

15. A zone servo sector format alignment scheme for rotating memory media of a disc drive comprising:

an outer recording zone defined on the media containing a preselected number of outer tracks;

each of said outer tracks having a preselected number of outer sectors which contain an outer servo field and an outer data field;

a set of preselected radial adjustment indicia spaced circumferentially about the media and aligned with selected of said outer sectors;

an inner recording zone defined on the media containing a preselected number of inner tracks;

each of said inner tracks having a preselected number of inner sectors which contain an inner servo field and an inner data field;

wherein the outer servo field are recorded at the same frequency as the inner servo fields and the inner data fields are recorded at a slower frequency than the outer data field;

wherein one of the number of preselected inner sectors is aligned with each of the radial alignment indicia;

a middle recording zone located between said outer recording zone and said inner recording zone of said media;

said middle recording zone containing a preselected number of middle data tracks;

each of said middle data tracks define a preselected number of middle sectors which contain a middle servo field and a middle data field;

wherein the number of inner sectors is less than the number of middle sectors, and the number of middle sectors is less than the number of outer sectors; and wherein one of the number of preselected middle sectors is aligned with each of the radial adjustment indicia.

16. The alignment scheme of claim 15 wherein:

one of said radial alignment indicia is defined as an index indicia;

there is a first gap which has a time period that is smaller than a time period for each middle sector, which first gap is located between a last middle sector of each middle data track and the index indicia; and there is a second gap which has a time period that is smaller than a time period for each inner sector, which second gap is located between a last inner sector of each inner track and the index indicia.

* * * * *